No. 850,850. PATENTED APR. 16, 1907.
R. RICHARDSON.
TRACTION ENGINE STEERING GEAR.
APPLICATION FILED SEPT. 7, 1905.
2 SHEETS—SHEET 1.
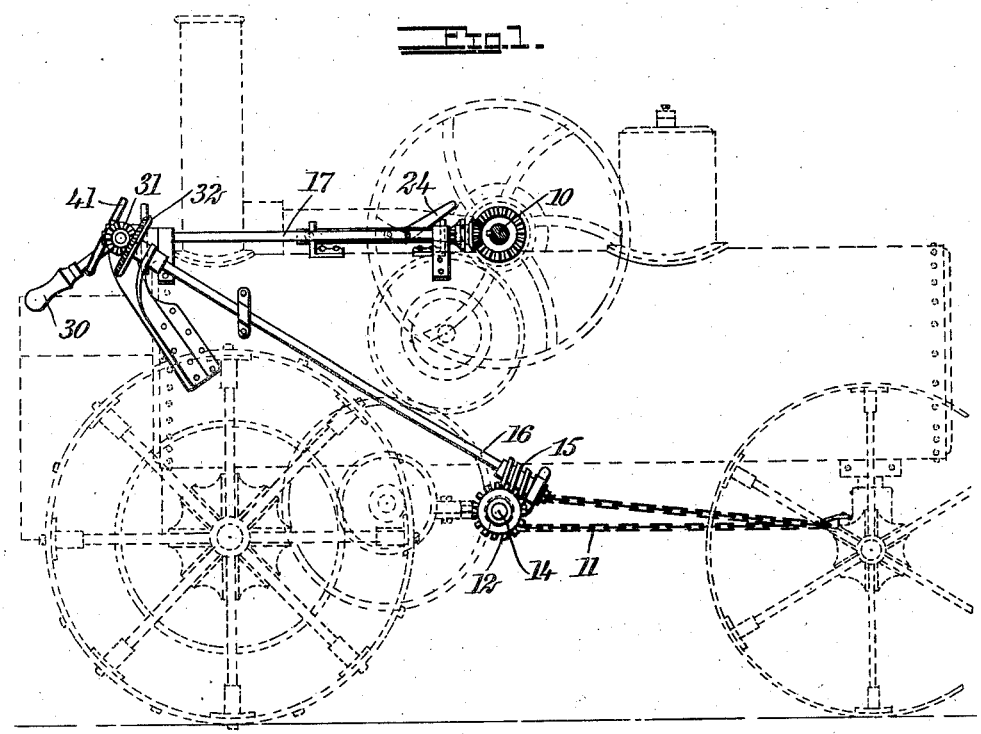
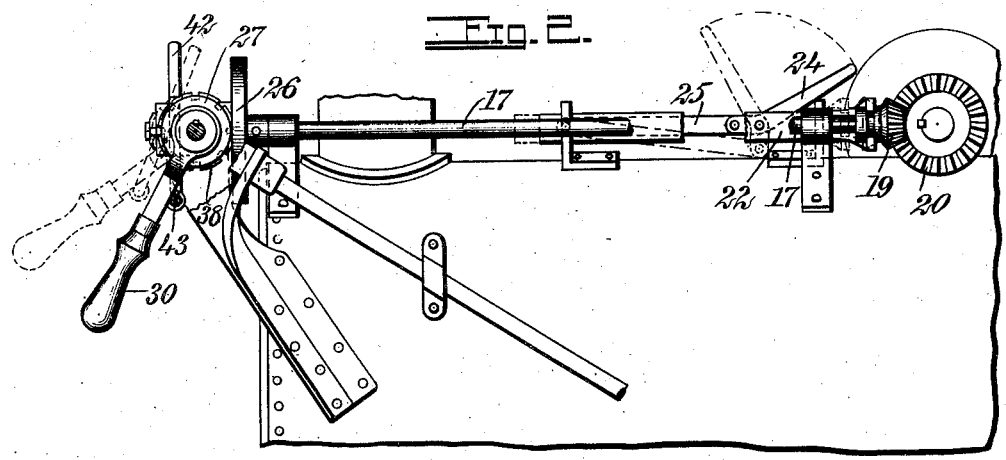
WITNESSES:
INVENTOR
Robert Richardson
BY
ATTORNEYS No. 850,850. PATENTED APR. 16, 1907.
R. RICHARDSON.
TRACTION ENGINE STEERING GEAR.
APPLICATION FILED SEPT. 7, 1905.
2 SHEETS—SHEET 2.
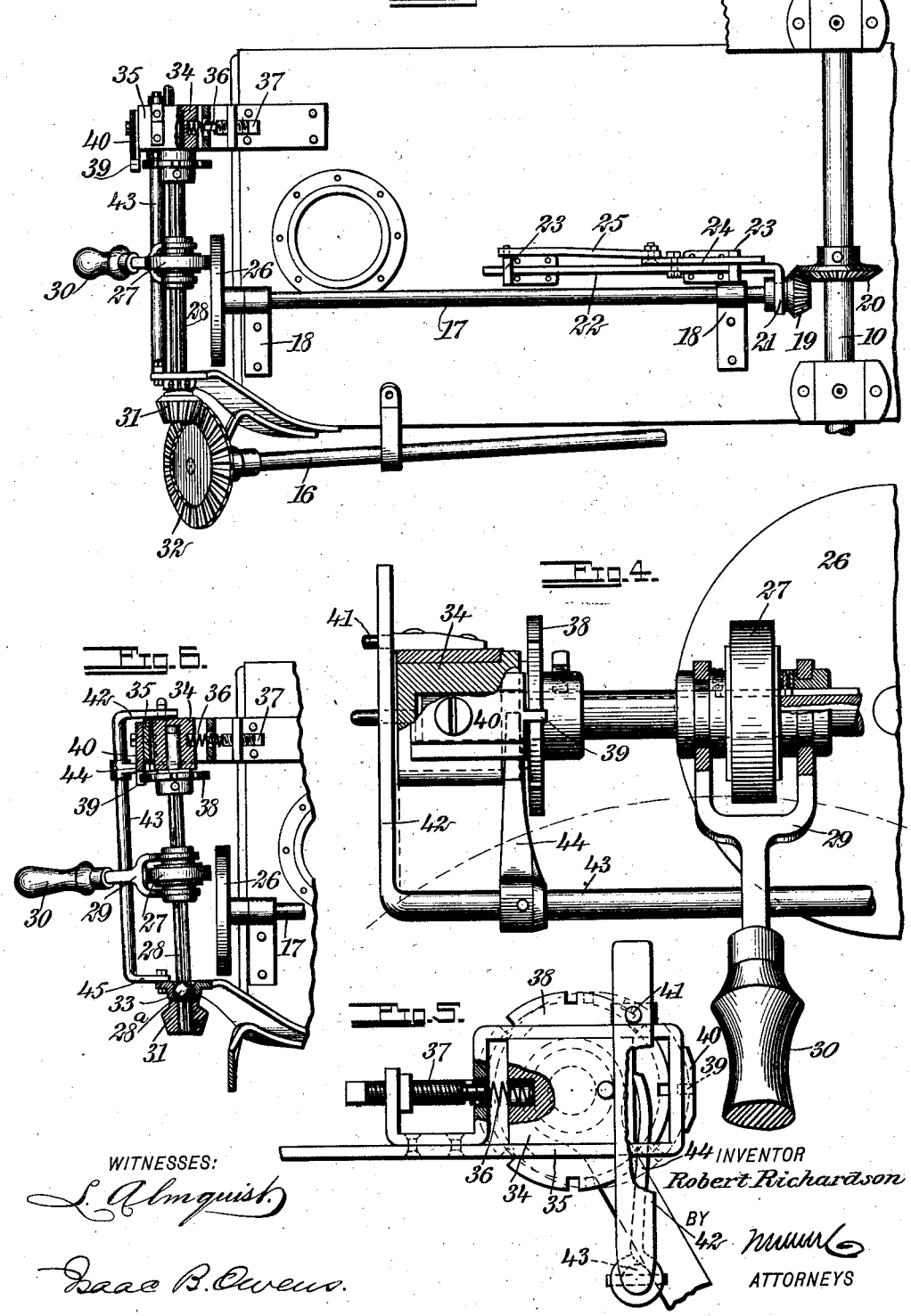
WITNESSES:
INVENTOR
Robert Richardson
BY
ATTORNEYS

UNITED STATES PATENT OFFICE.

ROBERT RICHARDSON, OF YATES CENTER, KANSAS, ASSIGNOR OF ONE-HALF TO ARTHUR B. ESTEP, OF YATES CENTER, KANSAS.

TRACTION-ENGINE STEERING-GEAR.

No. 850,850.            Specification of Letters Patent.           Patented April 16, 1907.

Application filed September 7, 1905. Serial No. 277,326.

*To all whom it may concern:*

Be it known that I, ROBERT RICHARDSON, a citizen of the United States, and a resident of Yates Center, in the county of Woodson and State of Kansas, have invented a new and Improved Traction - Engine Steering-Gear, of which the following is a full, clear, and exact description.

The invention relates to a power steering-gear designed particularly for use in connection with traction-engines, but applicable in other ways, as will be apparent hereinafter to skilled mechanics.

The invention resides in certain special features of construction and combinations of parts, which will be fully set forth hereinafter and particularly pointed out in the claims.

Reference is had to the accompanying drawings, which illustrate as an example the preferred embodiment of my invention, in which drawings—

Figure 1 is a side view showing in broken lines a traction-engine and illustrating by full lines my invention applied thereto. Fig. 2 is a sectional elevation showing the prime-mover shaft with a steering-gear and the counter-shaft and friction devices for driving the same. Fig. 3 is a plan view of the gearing. Fig. 4 is an enlarged fragmentary view showing the lock device for the counter-shaft and the shifting friction-wheel thereof. Fig. 5 is an end view of the lock devices, and Fig. 6 is a horizontal section taken through the counter-shaft.

In Fig. 1 the traction-engine is indicated by broken lines. 10 indicates the crank-shaft of the engine, which during the running of the machine is continuously in motion, as will be understood. 11 indicates the steering-chains, 12 a worm-wheel carried on a shaft 14 in connection with the chains 15, a worm which meshes with the worm-wheel, and 16 indicates the steering-shaft carrying the worm 15, all of which parts are well known in the prior art.

Revolubly mounted on top of the traction-engine is a shaft 17, which is carried in bearings 18 and is provided at its front end with a miter-gear 19, splined on the shaft and adapted to move in and out of mesh with a corresponding gear 20, fastened to the shaft 10. The gear 19 has a grooved hub engaged by a fork 21 on a slide 22. Said slide is held to move freely in bearings 23, arranged on top of the engine. Connected with the slide 22 is a lever 24, one end of which is joined by a link 25 to the stationary part of the engine. By throwing said lever 24 forward and backward the gear 19 may be engaged with and disengaged from the gear 20, and in this way the shaft 17 may be driven at will. At its rear end the shaft 17 carries a friction-wheel 26. This is adapted to be engaged by a corresponding friction-wheel 27, splined on a shaft 28. Loosely engaged with the hub of the friction-wheel 27 is a fork 29 on a handle 30, by means of which the gear 27 may be shifted across the face of the gear 26, thus regulating the speed at which the gear 27, and consequently the shaft 28, are driven and also the direction of rotation of said parts. The shaft 28 carries at its right-hand end a miter-gear 31, and this is in mesh with a corresponding gear 32, secured to the before-named steering-shaft 16. It will thus be seen that by moving the gear 27 across the face of the gear 26 the shaft 28 will be driven at a variable speed, and the direction of rotation may be readily changed. The shaft 28 drives the shaft 16 through the gears 31 and 32, and the shaft 16 turns the steering-axle of the traction-engine, so as to drive or steer said engine, all of which will be fully understood.

The shaft 28 is carried in two boxes 33 and 34. Said shaft has a spherical portion 28ᵃ in the box 33, which allows the shaft to swing slightly in the bearings. The box 34 is movable forward and backward in a guide 35 and is pressed rearward by a spring 36, engaging between the box 34 and an adjusting-screw 37, by means of which screw the tension of the spring may be regulated at will. Fastened to the shaft 28 adjacent to the box 34 is a notched wheel 38, and this is adapted to engage in a stud 39, projecting from a plate 40, secured to the front end of the guide 35. Mounted to swing around a pin 41, which is carried on top of the guide 35, is an arm 42, the lower end of which carries a bar 43, which, as shown in Figs. 4 and 6, is preferably formed integral with the arm. Fastened to said bar is an arm 44, and this is engaged with the box 34, as shown in Figs. 4 and 5. At its right-hand end the bar 43 is joined to or formed integral with an arm 45, which is fitted to the box 33, before explained. Said bar 43 lies under the handle 30 and is engaged thereby. The spring 36 holds the parts securely in the position shown in Fig. 6 and keeps the friction-wheel 27 disengaged from the friction-wheel 26. However, upon throwing down the handle 30 the bar is disengaged and said bar is swung forward, which, through the medium of the arm 44, results in throwing inward the box 34 and changing the position of the shaft 28. The lever 24 having been previously thrown to mesh the gears 19 and 20, it will be seen that the rotation of the shaft 17 and gear 26 will be imparted to the friction-wheel 27 and shaft 28. The instant that pressure on the handle is released the spring 36 returns the parts to the inactive position shown in Fig. 6. It will be seen that by operating the handle 30 the gear 27 may be shifted across the face of the gear 26 and by pressing down on the handle after the gear 26 has been shifted the parts will be thrown into mesh and the steering operation will be performed. When the parts are allowed to return to the position shown in Fig. 6, the stud 39 locks in the disk 38 and prevents changing the position of the steering-gear until the handle 29 is again operated. When in active adjustment, the parts assume the position shown in Fig. 1, the said elements 38 and 39 disengage, and the shaft 28 is then free to turn.

In the use of the invention, assuming the parts to be adjusted as shown, the lever 24 should be operated to keep the gears 19 and 20 engaged during the time that the traction-engine is operating as such. The shaft 17 and gear 26 are therefore in constant revolution. To steer the traction-engine, the operator should shift the gear 27 to the desired position with respect to the gear 26, so as to rotate the shaft 16 in one or the other direction, as desired. After this has been done the handle should be pushed down, so as to cause the bar 42 and arm 44 to move inward the box 34. The rotation of the shaft 28 will now follow the rotation of the shaft 17, and the shaft 16 will be driven, which movement will continue as long as the pressure on the handle 30 is maintained. The instant this pressure is relaxed the parts will return to the inactive position, as shown. It thus follows that by the manipulation of the handle 30 the engine may be steered at will. When the traction-engine comes to a standstill or it is desired to operate the engine proper—for instance, to drive the machine—the lever 24 should be thrown into inactive position, thus disconnecting the gears 19 and 20.

While I have particularly described the invention as a steering-gear for traction-engines, it nevertheless should be noted that it may be applied with equal ease to automobiles and all motor-vehicles, the shaft 10 representing either the crank-shaft of the engine or some continuously-rotating shaft driven from the engine.

Having thus described the preferred embodiment of my invention, what I claim as new, and desire to secure by Letters Patent, is—

1. In a motor-driven vehicle, the combination with the steering-gear, of a continuously-rotating shaft on the vehicle, a shaft driven thereby, a friction-wheel attached to the second shaft, a second friction-wheel movable across the face of the first friction-gear, a shaft on which the second friction-gear is splined, and means for connecting the last-named shaft with the steering-gear.

2. In a motor-driven vehicle, the combination with a steering-gear and with a continuously-moving shaft on the vehicle, of a second shaft, releasable means for driving the second shaft from the said prime-mover shaft, a friction-gear attached to the second shaft, a second friction-gear movable across the face of the first friction-gear, a shaft on which the second gear is splined, and means for driving the steering mechanism from the third shaft.

3. In a motor-driven vehicle, the combination with a steering-gear and with a continuously-moving shaft thereof, of a gear fastened to said shaft, a second shaft, a gear splined on the second shaft and adapted to mesh with the gear on the continuously-moving shaft, means for operating the gear on the second shaft, a friction-gear attached to the second shaft, a second friction-gear movable across the face of the first friction-gear, for the purpose specified, a counter-shaft on which the second friction-gear is splined, and means for driving the steering-gear from said counter-shaft.

4. The combination with a motor-vehicle having a steering-gear and a continuously-moving shaft, of a second shaft driven from the continuously-moving shaft, a friction-gear on the second shaft, a counter-shaft, a friction-gear on the counter-shaft and adapted to engage with the friction-gear on the second shaft, means for mounting the counter-shaft to move laterally toward and from the first-named friction-gear, for the purpose specified, means for so moving the counter-shaft, and means connecting the counter-shaft with the steering mechanism.

5. In a motor-driven vehicle, the combination with the steering-gear, of a continuously-rotating shaft on the vehicle, a shaft driven thereby, a friction-gear on said last-named shaft, a second friction-gear adapted to mesh with the first friction-gear, a counter-shaft carrying the second friction-gear, a connection between the counter-shaft and the steering-gear, a box on which the counter-shaft is mounted, a guide in which the box is movable, and a device connected with said box to move the same whereby to engage the friction-gears together.

6. In a motor-driven vehicle the combination with the steering-gear, of a continuously-rotating shaft on the vehicle, a shaft driven thereby, a friction-gear on said last-named shaft, a second friction-gear adapted to mesh with the first friction-gear, a counter-shaft on which the second friction-gear is splined, a connection between the counter-shaft and the steering-gear, a box in which the counter-shaft is movable, a guide in which said box is slidable, and a swinging member adapted to engage the box to move the same whereby to engage the two friction-gears together.

7. In a motor-driven vehicle the combination with the steering-gear, of a continuously-rotating shaft on the vehicle, a shaft driven thereby a friction-gear on said last-named shaft, a second friction-gear adapted to mesh with the first friction-gear a counter-shaft on which the second friction-gear is splined, a connection between the counter-shaft and the steering-gear, a box in which the counter-shaft is mounted, a guide slidably carried in said box, a swinging member adapted to engage the box whereby to engage the two friction-gears together, and means for adjusting the second gear on the counter-shaft, the said means engaging said swinging member to operate the same.

8. In a motor-driven vehicle the combination with a steering-gear, of a continuously-driven shaft on the vehicle, a shaft driven thereby a gear on said last-named shaft, a counter-shaft, a connection between the counter-shaft and the steering means, a gear on the counter-shaft, means for adjustably mounting the counter-shaft to permit of engaging and disengaging the gears, and means for automatically locking the counter-shaft upon disengaging the gears.

9. In a motor-driven vehicle, the combination with the steering-gear, of a continuously-driven shaft on the vehicle, a shaft driven thereby a gear on said last-named shaft, a counter-shaft, a connection between the counter-shaft and the steering-gear, a gear on the counter-shaft, means for adjustably mounting the counter-shaft to admit of engaging and disengaging a notched member secured to the counter-shaft, and a relatively stationary member adapted to engage the stationary member upon disengaging the gears for the purpose specified.

10. In a motor-driven vehicle, the combination with the steering-gear, of a continuously-driven shaft on the vehicle, a shaft driven thereby a gear on said last-named shaft, a counter-shaft, a connection between the counter-shaft and the steering-gear, a gear on the counter-shaft, means for adjustably mounting the counter-shaft to admit of engaging and disengaging the gears, a notched member secured to the counter-shaft, a relatively stationary member adapted to engage the notched member upon disengagement of the gears for the purpose specified, means for yieldingly pressing the counter-shaft to disengage the gears and means for manually moving the counter-shaft to engage the gears.

11. In a motor-driven vehicle the combination with the steering-gear, of a continuously-driven shaft on the vehicle, a shaft driven thereby a gear on said last-named shaft, a counter-shaft, a connection between the counter-shaft and the steering-gear, a gear on the counter-shaft, means for adjustably mounting the counter-shaft to adapt it to engage and disengage the members, means for automatically locking the counter-shaft upon disengagement of the gears, means for yieldingly pressing the counter-shaft to disengage the gears, and means for manually moving the counter-shaft to engage the gears.

In testimony whereof I have signed my name to this specification in the presence of two subscribing witnesses.

ROBERT RICHARDSON.

Witnesses:
F. J. WHITTAKER,
G. R. STEPHENSON.